March 15, 1966 W. F. DOWDLE ETAL 3,240,904
CIRCUIT BREAKER ASSEMBLY
Filed Aug. 12, 1963
3 Sheets-Sheet 1

INVENTORS:
WALTER F. DOWDLE,
LYLE J. WENZEL,
BY J. Wesley Haubner
ATTORNEY.

March 15, 1966 W. F. DOWDLE ETAL 3,240,904
CIRCUIT BREAKER ASSEMBLY
Filed Aug. 12, 1963 3 Sheets-Sheet 2
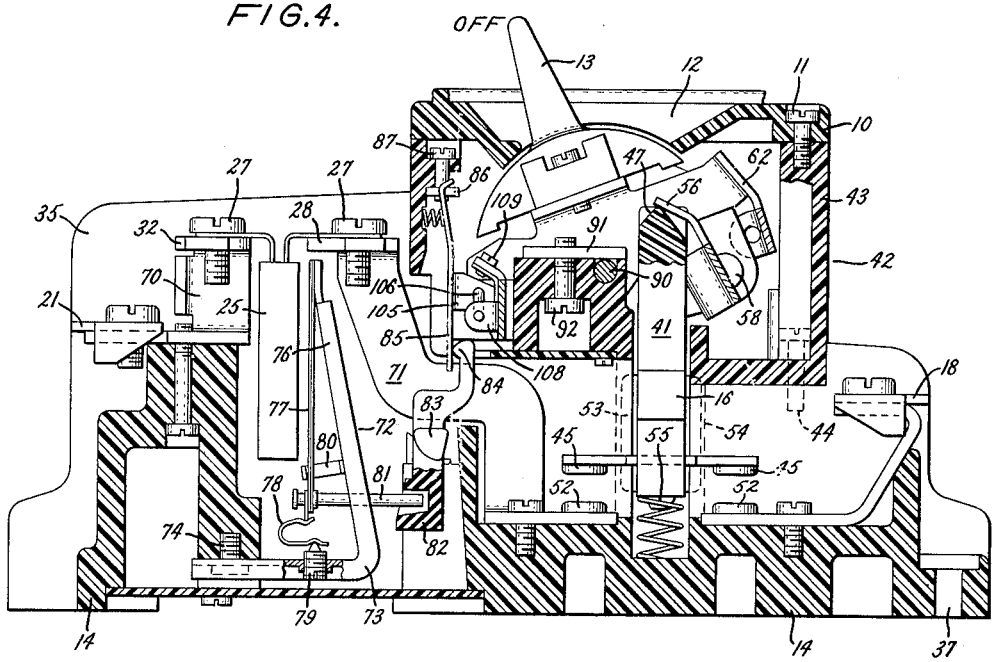
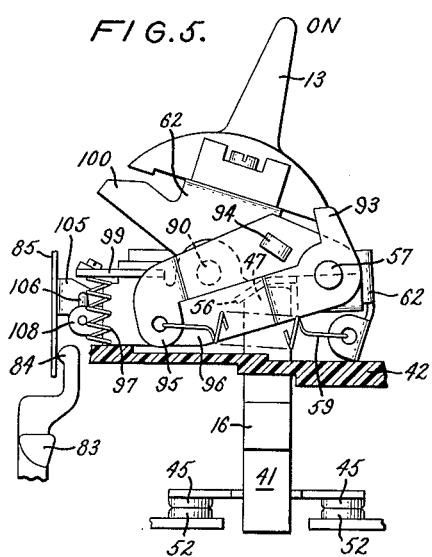
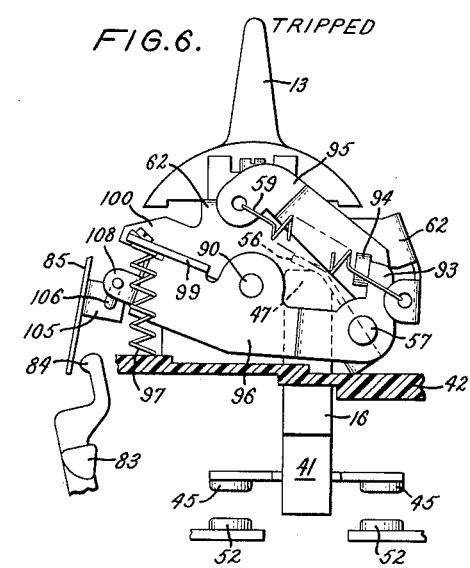
INVENTORS:
WALTER F. DOWDLE,
LYLE J. WENZEL,
BY J. Wesley Haulsen
ATTORNEY.

March 15, 1966 W. F. DOWDLE ETAL 3,240,904
CIRCUIT BREAKER ASSEMBLY
Filed Aug. 12, 1963 3 Sheets-Sheet 3

INVENTORS:
WALTER F. DOWDLE,
LYLE J. WENZEL,
BY J. Wesley Haubner
ATTORNEY.

United States Patent Office 3,240,904
Patented Mar. 15, 1966

3,240,904
CIRCUIT BREAKER ASSEMBLY
Walter F. Dowdle, Freeport, and Lyle J. Wenzel, Normal, Ill., assignors to General Electric Company, a corporation of New York
Filed Aug. 12, 1963, Ser. No. 301,361
14 Claims. (Cl. 200—116)

This invention relates to electrical switching devices, and more particularly, to controllable circuit breakers having means to trip the circuit breaker in response to electrical overloads.

Circuit breakers have found wide application in assemblies of industrial control devices known as control panels, wherein the circuit breakers control the application of electrical power to a wide variety of loads including motors of many types. Among the prime considerations in the selection of control components for use in such panels is their size. Accordingly one of the general objects of this invention is to provide a circuit breaker having an unusually small size for a given electrical rating.

Other important features in the design and selection of circuit breakers are reliability of operation and ruggedness of construction. Still further important factors are the ease of assembly and disassembly for inspection and replacement, if necessary, of certain components. Especially important is versatility of application so that certain basic mechanisms are capable of controlling power to a wide variety of electrical loads.

The invention has as one of its objects to provide a versatile circuit breaker assembly having a unitary, removable manually operated toggle mechanism, which itself contains no electrical contacts, and which can be applied interchangeably to a variety of basic switching assemblies.

Another object is to provide a circuit breaker having an unusually compact toggle mechanism, the separate parts of which are efficiently arranged and constructed to make maximum effective use of the space which they occupy.

A still further object of the invention is to provide a circuit breaker assembly having a highly reliable but nevertheless simple trip mechanism responsive to overload conditions to open the circuit to the load controlled by the circuit breaker.

Yet another object of the invention is the provision in a circuit breaker assembly of a sturdy, easily removable and readily adjustable overload assembly which responds accurately to an electrical overload condition to trip the circuit breaker and thereby open its contacts.

In accordance with a preferred embodiment of the invention, there is provided a circuit breaker housing having stationary contacts arranged along the base thereof and a bridging contact-carrying arm disposed to reciprocate slideably toward and away from the stationary contacts, thereby to open and close electrical continuity through the stationary contacts. The contact-carrying arm carries an actuating extension which projects outside the housing. A separate toggle mechanism contained within its own casing is fastened removably atop the housing, where it surrounds and encloses the extending end of the contact-carrying arm. The toggle mechanism is wholly mechanical, carrying no electrical contacts of its own, but is arranged to actuate the underlying switch contacts by controlling movements of the arm extension which it surrounds.

In normal manual operation of the circuit breaker, movements of an operating handle transverse to an upper surface of the toggle casing are translated through a spring-biased overcenter mechanism into vertical movements of a pivotal drive yoke which strikes the end of the arm extension and drives it downward to close the switch contacts. The toggle may also be operated in response to an overload condition and for this purpose an additional spring-biased overcenter link mechanism is provided to trip a normally stationary yoke of the toggle assembly. When this is done the pivotal axis of the drive yoke is forced overcenter, causing the drive yoke to spring away from the contact-carrying arm. The operating handle then assumes a neutral disabled position indicative of the fact that the toggle mechanism has been tripped.

The overload condition which causes the toggle mechanism to be tripped is sensed by one or more unusually compact unitary bimetallic overload assemblies which are inserted cartridge-like into the bottom or base of the housing and which are each removable simply by the loosening of one screw. Movements of the bimetal portion of the overload assembly are converted by still another overcenter arrangement into a rapid thrust of an operating rod. The operating rod, affixed to one end of the bimetal, extends through an aperture in the rigid cantilever support arm which carries the bimetal to engage a cupped recess in a rocker-like trip arm. Another portion of the trip arm engages a trip lever of the overcenter link mechanism previously referred to for tripping the toggle mechanism.

These and other novel features believed characteristic of the invention are set forth in the appended claims. The construction of a preferred embodiment of the invention, together with further objects and advantages thereof, may be more readily understood, however, from the following description taken in connection with the accompanying drawings in which, FIGURE 1 is a top view of a three-pole circuit breaker assembly constructed in accordance with the principles of this invention;

FIGURE 4 is a cross-section view taken on line 4—4 of FIGURE 1;

FIGURE 5 is a side view of the toggle assembly shown in FIGURE 4 in its "on" condition;

FIGURE 6 is a view similar to that of FIGURE 5, illustrating the condition of the toggle mechanism after it has been tripped in response to an electrical overload;

Figure 1:
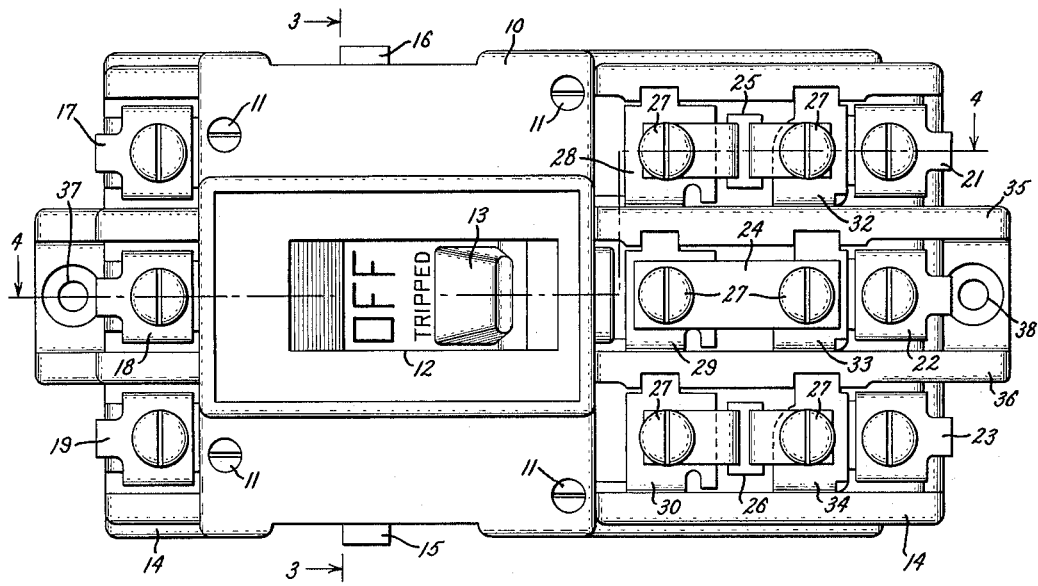

In FIGURE 1 can be seen from the top cover 10 of a toggle assembly fastened to a toggle casing beneath by screws 11. Through window 12 of the cover 10 there projects an operating handle 13 of the toggle mechanism to be described. The operating handle carries at its base certain signals visible through window 12 indicative of the "on" or "off" condition of the circuit breaker, the handle being shown in its "off" position. As will be described in more detail in connection with succeeding figures, the toggle mechanism within the casing beneath is mounted removably atop the circuit breaker housing 14, which is constructed of an insulating material such as Bakelite. Mounted within the housing 14 but concealed from view in FIGURE 1 is a switching mechanism containing fixed and movable electrical contacts. The movable contacts are carried by a switch member shown in the form of a slideable contact-carrying arm, the ends 15 and 16 of which project through and beyond the sides of housing 14. The contact-carrying arm is mounted for reciprocating switching action in a direction perpendicular to the plane of FIGURE 1. The switching action of the contact-carrying arm controls the application of electrical power from source terminals 17, 18 and 19 to load terminals 21, 22 and 23.

Intermediate the source and load terminals there may be and there preferably are installed certain additional load controlling elements such as shunt 24 and overload resistance heaters 25 and 26. The latter resistance heaters and the shunt 24 are interchangeably connected by screws 27 between intermediate terminals 28, 29 and 30 on the one hand and intermediate terminals 32, 33 and 34 on the other. These separate intermediate terminals are otherwise electrically independent of each other except through the aforesaid shunt and resistance heaters. Electrical isolation between the separate sets of terminals is assured by the upstanding projections 35 and 36 on housing 14. The entire assembly may be fastened to a panel or switch box through apertures 37 and 38 provided for that purpose at opposite ends on the base of the housing 14.

Figure 2:
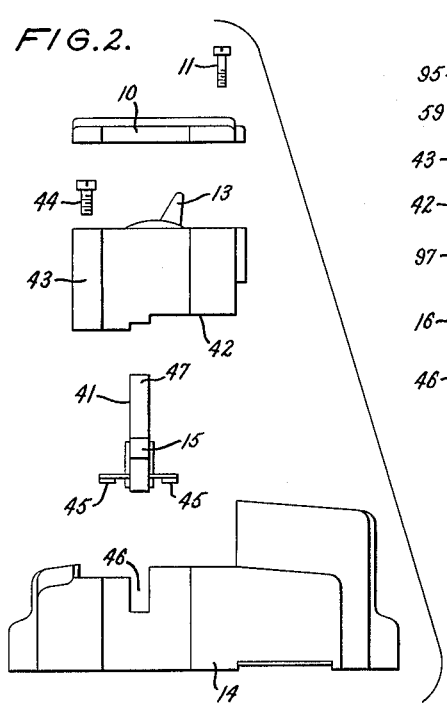
FIGURE 2 is an exploded side view of the assembly shown in FIGURE 1 with certain major portions thereof shown as subassemblies.

Referring now to FIGURE 2 which shows the circuit breaker assembly from the side, partly disassembled, there may be seen the basic housing 14, the slidable contact-carrying arm 41, the toggle assembly 42 and its overlying cover 10. Just as cover 10 is removably fastened to toggle casing 43 by screws such as the one indicated at 11 passing through the cover and threadably received in the casing, so the toggle casing 43 is fastened to and removable from housing 14 by screws such as the one indicated at 44 passing through casing 43 and into the housing 14. The toggle assembly 42 contains no electrical contacts, being a wholly mechanical assembly. Instead of operating upon its own contacts, the enclosed removable toggle assembly 42 operates upon the sliding contact arm 41 which carries at its lower end movable bridging contacts 45. This contact-carrying arm 41 in normal operation slides vertically within the basic housing 14 with end 15 sliding along and projecting through slot 46. The purpose of the contact arm extensions 15 and 16 projecting through the sides of the housing is to provide actuation for auxiliary switching devices which may be fastened selectively to the outer side walls of the circuit breaker assembly. A stem-like switch actuator portion 47 at the top of the contact-carrying arm extends out of housing 14 and into the casing 43 of the toggle mechanism. When the toggle mechanism is unfastened as shown in this figure, the contact arm assembly 41 can be lifted out of the housing 14 for inspection, repair or replacement.

Figure 3:
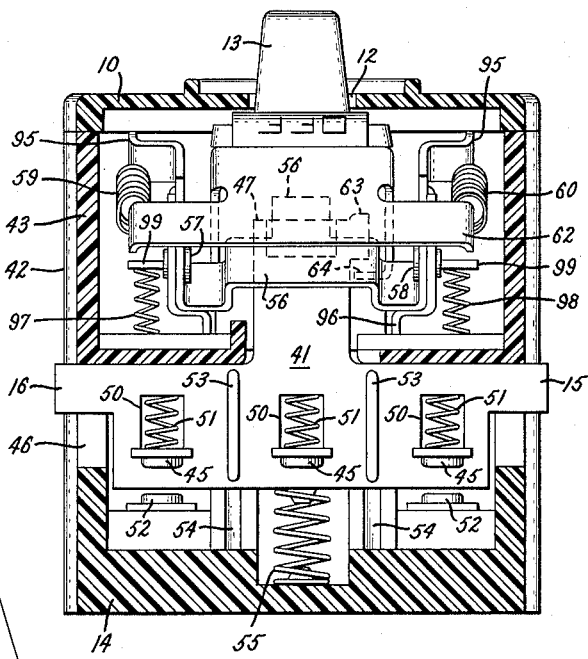
FIGURE 3 is a cross-section view taken on line 3—3 of FIGURE 1.

In FIGURE 3 the contact-carrying arm 41 is discernable as having an inverted T shape with three sets of movable bridging contacts 45 held resiliently captive within slots 50 by springs 51 which urge the contacts toward the bottom of their slots. The movable contacts 45 cooperate with stationary contacts 52 fastened in the base or bottom of the housing 14. As an aid to electrical isolation between the three poles of the circuit breaker and to guide the arm in its vertical reciprocating movements, ridges 53 on opposite faces of the contact-carrying arm fit closely but slideably within grooves 54 in the housing. A return spring 55 in the base of the housing urges the contact carrying arm upward toward the "off" position in which the bridging contacts 45 are separated from stationary contacts 52.

To close the switch contacts against the bias provided by return spring 55 a drive yoke 56 in the upper toggle mechanism 42 is mounted on pivots 57 and 58 to strike the upper end of the actuating stem 47 on the contact-carrying arm thereby to force it downward. The force to accomplish this action is supplied by toggle springs 59 and 60 which are connected between the drive yoke 56 and the operating yoke 62. It is to be noted that toggle springs 59 and 60 are not mounted in the typical fashion to extend downward from the operating handle, but are arranged instead to extend generally from side to side of the casing roughly parallel to the movements of the operating handle. Also instead of being centrally mounted the toggle springs are located on opposite sides of the toggle mechanism leaving the space between them available for occupation by other parts of the toggle mechanism.

The toggle springs are driven overcenter to an opposite side of the drive yoke pivots 57 and 58 when the operating handle 13, which is attached to operating yoke 62, is moved to the "on" position. When the operating handle 13 is returned to its "off" position, the toggle springs 59 and 60 pass once again overcenter past the drive yoke pivots 57 and 58 thereby snapping the drive yoke upward. When this happens the return spring 55 forces the contact-carrying arm 41 upward and opens the contacts. Provision is made to force the movable contacts away from the fixed contacts in the event that they become welded or otherwise stuck to each other in operation. This is accomplished by providing a sideward extension 63 on the upstanding stem of the contact arm and an interference arm 64 on the operating yoke. When the operating yoke 62 is switched from an "on" position to an "off" position the interference arm follows up the sideward extension on the contact arm, and if the contacts adhere to each other the interference arm 64 strikes the extension 63 to knock the contacts apart.

In addition to the manually operable means described for controlling the circuit breaker, means are also provided to trip the circuit breaker automatically from an "on" condition to an "off" condition in response to an electrical overload through the switch contacts. In FIGURE 4 the means to accomplish this purpose are shown. In this figure electrical continuity can be traced from terminal 21 through connecting support member 70 and, thence, through overload resistance heater 25 which is connected between intermediate terminals 32 and 28 by screws 27. Electrical continuity then continues through conducting support member 71 and through stationary contacts 52 and movable bridging contacts 45 to a terminal at the opposite end of the circuit breaker assembly. The purpose of the overload resistance heater 25 is to generate substantial quantities of heat in response to excessive electrical currents through the switching circuit.

An overload protective assembly 72 positioned immediately adjacent the resistance heater 25 responds to the high temperatures produced to initiate a protective tripping operation of the toggle mechanism to open the circuit breaker contacts. The overload protective assembly 72 consists of a small number of parts held together in a unitary assembly which can be inserted cartridge-like into the base of the circuit breaker mechanism. A rigid bracket 73 having the general configuration of an L is fastened to the circuit breaker base 14 by a single screw 74 which fastens the base portion of the bracket within a groove left for this purpose in the base. To provide rigidity for an upwardly extending cantilever support arm 76 the bracket 73 is constructed with a channel-shaped cross section. The rigidity provided contributes to the precision of operation of the mechanism attached to the bracket. This mechanism includes an elongated bimetallic element 77 welded at one end to the extreme terminal portion of the cantilever support arm 76 and extending generally along but spaced from the support arm toward the base portion of the bracket immediately adjacent the overload resistance heater 25 in heat absorbing relationship thereto.

The high expansion side of the bimetal faces the overload resistance heater 25 so that elevated temperatures tend to flex the lower end of the bimetal as seen in FIGURE 4 toward the right. Resisting such flexing movements is a C-shaped overcenter spring 78 connected between the lower end of the bimetal and adjusting screw 79 threaded through the base of the rigid bracket 73. The C-shaped overcenter spring 78 is trapped between the linear lower edge of the bimetal 77 and a single point at the apex of the adjusting screw 79. As the bimetal is heated, the increasing force on the overcenter spring 78 causes the tip of the bimetal suddenly to snap to the right with a rapid thrust. Similarly, upon cooling the bimetal does not return gradually to the position shown in FIGURE 4 but snaps back again. To prevent the bimetal from curling too far to the left where it might contact the surface of resistance heater 25, a restraining element 80 having a C-shaped configuration is fastened to the cantilever support arm 76 extending around to the high expansion side of the bimetal to limit the movement of the bimetal in that direction.

At the lower movable end of the bimetal an aperture is provided through which extends a push rod 81 having flanges on opposite sides of the aperture to trap the push rod within the aperture and prevent its loss. The push rod 81 extends through another aperture provided in the L-shaped bracket 73 adjacent the end of the bimetal and into a cupped recess within a trip arm 82. The purpose of this arrangement of parts is to transmit the snap acting movements of the lower end of bimetal 77 to a position beyond the protective overload assembly to initiate a protective opening of the circuit breaker contacts and also to permit the easy removal and insertion of the protective overload assembly. Because of the disposition of parts and the rigidity of the bracket 73, and also because the separate elements of the overload protective assembly constitute a basic unitary removable structure, such assemblies can be calibrated with accuracy completely apart from the circuit breaker and then inserted therein with assurance that the overload protective assembly will function accurately when called upon to do so in response to an overload condition. The other resistance heater 26 shown in FIGURE 1 also has associated with an overload protective assembly of the nature described with its thrust rod extending into another cupped recess in trip arm 82 so that either one of the overload protective assemblies can trip the circuit breaker mechanism. In a typical three-phase circuit connection no more than two such overload protective assemblies are necessary to detect excessive currents in the circuit. Hence, in the top view of FIGURE 1, there is shown a simple shunt 24 in the central conducting path instead of a resistance heater with an associated overload protective assembly.

The thrust of rod 81 within the cupped portion of trip arm 82 causes the trip arm to rotate about its pivot 83 in a counterclockwise direction as seen in FIGURE 4. This movement of the trip arm forces its upper extremity 84 against the lower end of latch arm 85 mounted within the casing of toggle assembly 42. The upper end of latch arm 85 is mounted for slight pivotal movement on a lug 86 attached to the base of mounting screw 87. A bias spring 88 urges the latch arm 85 to the right as seen in FIGURE 4.

Figure 7:
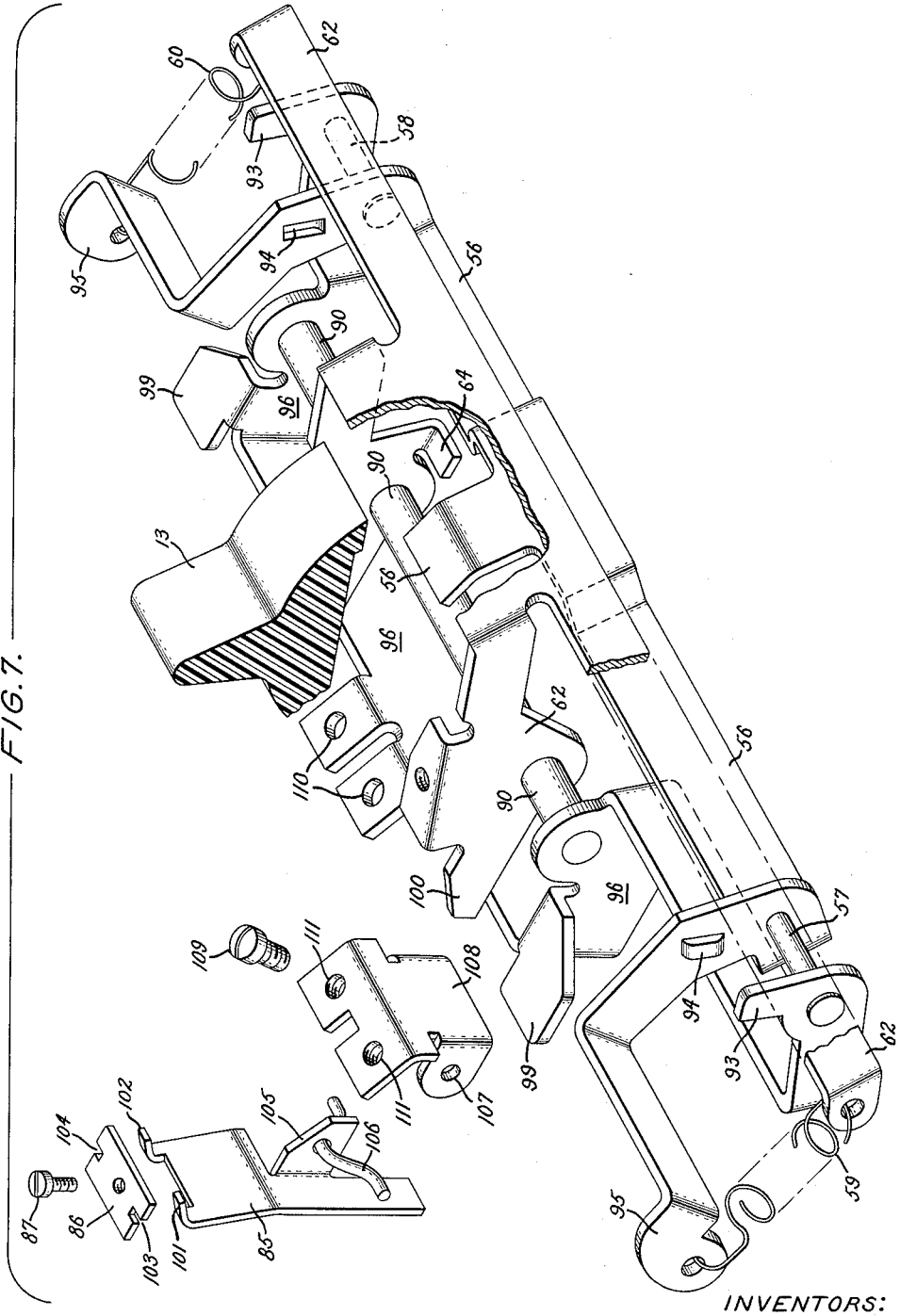
FIGURE 7 is an elongated perspective view of the toggle mechanism shown in FIGURES 3, 4, 5 and 6 with some portions broken away and others disassembled to show the interrelationships of parts.

The construction features of the toggle mechanism which permit it to be tripped "off" and which account for the unique compactness and reliability of the toggle mechanism are now to be described. It will be desirable during this portion of the description to refer variously to FIGURES 4, 5, 6 and 7. In FIGURE 4 it can be seen that operating yoke 62 is mounted for limited pivotal movement on shaft 90 which, in turn, is mounted in a fixed position in a groove in the base of casing 43 and is fastened therein by a plate 91 clamped over the groove by screw 92. The drive yoke 56 which, as has been indicated, is operated in response to pivotal movements of the operating yoke 62 and its handle 13, is mounted on pivots 57 and 58 defining a separate pivotal axis laterally displaced from and parallel to shaft 90. In the "off" position represented in FIGURE 4 the upward limit of movement of drive yoke 56 about its pivotal axis is established by an interference between lug 93 and a struck-out portion 94 (see FIGURES 5, 6 and 7) on the lever arm 95 of drive yoke 56. Movement of the operating handle from the "off" position shown in FIGURE 4 to the "on" position shown in FIGURE 5 causes the line of force of toggle springs 59 and 60 to move overcenter past pivots 57 and 58, and the springs then force drive yoke 56 downward or counterclockwise to the position shown in FIGURE 5 where further movement is limited by an abutment between lever arm 95 of the drive yoke and the base of casing 42.

In this condition drive yoke 56 forces the top or stem portion of contact-carrying arm 41 downward to bring the bridging contacts 45 into contact with the stationary contacts 52, thereby compressing not only the return spring 55 but also, to a limited extent, the bridging contact springs 51 (see FIGURE 3).

It is to be particularly noted that drive yoke 56 is mounted to pivot on a normally stationary trip yoke 96. The trip yoke is also mounted for pivotal movement about stationary shaft 90, the same shaft about which the operating yoke pivots. This feature contributes further to the compactness of the toggle assembly. The trip yoke 96 is normally latched in the position shown in FIGURE 5, but when released from this latched position as a result of an electrical overload condition, it springs to the position shown in FIGURE 6, being urged toward that position by a pair of stiff trip springs 97 and 98 bearing against two shoulders 99 on trip yoke 96.

In making this movement the trip yoke 96 carries with it the pivots 57 and 58, forcing the pivotal axis of the drive yoke 56 downward and actually increasing, for a moment, the drive force exerted on the stem of the contact carrying arm 41. As a consequence two events occur: the return spring 55 and the bridging contact springs 51 are further compressed and the pivotal axis of drive yoke 56 is driven overcenter past the line of force of the toggle springs 59 and 60. Instantly the drive yoke is toggled upward out of engagement with the contact-carrying arm stopping only when the struck-out portion 94 on the drive yoke strikes the lug 93 on the lever arm 95 of the trip yoke. Thereafter, the contact-carrying arm 41 is driven upward, at first under the combined forces of the fully compressed bridging contact springs 51 and the return spring 55, to open the electrical contacts. The extra forces provided for this operation by these springs aid in breaking any welded connections which may have been forced between the electrical contacts due to the excessive electrical currents therethrough. When these events occur the operating yoke 62 and the handle 13 are moved toward their "off" position by the force of toggle springs 59 and 60. The operating yoke and handle are, however, stopped at an intermediate position by the abutment between an extension 100 of the operating yoke 62 and the now tripped trip yoke 96.

The mounting of the drive yoke pivotally on the trip yoke with the two pivotal axes of these elements laterally displaced from each other permits the toggle to be made very compactly. As can be seen in FIGURES 4 through 7, the driving force of the drive yoke is downwardly directed immediately beneath the operating handle 13 and between the pivotal axes of the operating yoke assembly on the one hand and of the drive yoke on the other hand. In most toggle mechanisms such an arrangement is not possible and the switch actuating member must be located a substantial distance below the pivotal axis of the operating handle assembly, thereby requiring the toggle mechanism to occupy a much greater depth in its casing.

Attention is now directed to the latching trip link assembly by which the trip yoke is held in its normal operating position and released or tripped to an overload position. The basic elements of the latching trip link assembly are shown in FIGURES 4, 5 and 6 but are more clearly visible as disconnected elements in FIGURE 7. Therein can be seen the latch arm 85 with its bifurcated upper end having projections 101 and 102 which engage slots 103 and 104 respectively in lug 86 to provide a rocking engagement therein. On the central portion of latch arm 85 a perpendicular projection 105 having an aperture therethrough engages the center of trip link 106. Trip link 106 resembles a crankshaft, being generally in the shape of a C with divergently extended ends. The outer ends of the trip link are retained in apertures 107 of link bracket 108 bolted to the trip yoke by screws 109 which pass through apertures 110 in the trip yoke and into threaded recesses 111 in the link bracket.

In its latched condition the trip link 106 occupies the position shown in FIGURE 5 with its ends below its central portion. The force exerted by trip springs 97 and 98 upon the over-lying shoulders 99 of trip yoke 96 tends to rotate the outer ends of the link 106 in a clockwise direction to the left of the pivotal connection between the center of the link and the aperture within projection 105 of latch arm 85. The link, however, is restrained against movement in this direction by the engagement between the extreme end of projection 105 and the center of link bracket 108. When in response to an overload condition the protective overload assembly causes the upper extremity 84 of trip arm 82 to thrust the latch arm 85 to the left, the central portion of link 106 is moved toward the left, passing over the line of force exerted on the link by the trip springs. The thrust of trip springs 97 and 98 then forces the link to rotate in a counterclockwise direction about its central portion to a raised position as shown in FIGURE 6 and also rotates the trip yoke to the position shown therein.

After the condition responsible for the electrical overload has been corrected and the protective overload assembly has cooled and relaxed to its original position, the toggle mechanism can be reset by moving the operating handle to the "off" position shown in FIGURE 4. When this is done the projections 100 on the end of the operating yoke engage the trip yoke and force it against the bias of trip springs 97 and 98 until the trip link mechanism is reset to its normal latched condition. The circuit breaker can then be switched "on" again.

It will thus be seen that a circuit breaker assembly has been provided which meets the objectives of compactness, simplicity and reliability. The circuit breaker described is also characterized by ease of disassembly for inspection, repair and adjustment purposes and for interchangeability of parts. The toggle mechanism can be removed and, if desired, replaced by another form of actuator such as a pushbutton assembly or even an electromagnet-type actuator. It is thus not necessary to reconstruct the entire circuit breaker for it to serve a variety of purposes.

Although there has been described a particular embodiment of this invention, many modifications may be made in the combination described and it is to be understood that the appended claims are intended to cover all such modifications that fall within the true spirit and scope of the invention.

What is claimed as new and is desired to be secured by Letters Patent of the United States is:

1. A circuit breaker assembly comprising:
a switch housing containing electrical contacts;
a switching member mounted in said housing for reciprocating switch actuating movement, said switching member having an actuating portion extending beyond said housing;
a casing removably mounted on said housing over said switching member; and
a toggle mechanism mounted within said casing and removable with said casing including
a pivotal operating member having a handle extending through said casing and movable between "off" and "on" positions in directions transverse to the direction of reciprocation of said switching member, and
means including a pivotal drive member arranged to engage the actuating portion of said switching member and operable in response to movements of said operating member and handle between said "off" and "on" positions to drive said switching member in reciprocating movements.

2. A circuit breaker assembly comprising:
a switch housing containing electrical contacts adjacent a base portion thereof;
a switching member mounted in said housing for reciprocating switch actuating movement, said switching member having an end extending beyond said housing;
spring means in said housing urging said switching member toward an "off" position away from the base of said housing;
a casing removably mounted on said housing over the end of said switching member;
a toggle mechanism mounted within said casing and removable with said casing including
a pivotal drive member arranged to engage the end of said switching member and to drive said switching member in reciprocating movements toward the base of said housing, and
means including a pivotal operating member having a switch handle extending through said casing on the side opposite from said housing and operable in directions transverse to the direction of reciprocation of said switching member for operating said pivotal drive member.

3. A circuit breaker assembly comprising:
a switch housing containing electrical contacts;
a switching member mounted in said housing for reciprocating switch actuating movement, said switching member having an actuating portion extending beyond said housing;
a casing removably mounted on said housing over said switching member; and
a toggle mechanism mounted within said casing and removable with said casing including
a pivotal drive member arranged to engage the actuating portion of said switching member and to drive said switching member in reciprocating movements, and
a pivotal operating member having a handle extending through said casing and operable in directions transverse to the direction of reciprocation of said switching member, and
means including toggle spring means interconnecting said drive member and said operating member for effecting snap acting movements of said drive member in response to operative movements of said handle.

4. A circuit breaker assembly comprising:
a switch housing containing electrical contacts;
a switching member mounted in said housing for reciprocating switch actuating movement, said switching member having an actuating portion extending beyond said housing;
a casing removably mounted on said housing over said switching member;
a toggle mechanism mounted within said casing and removable with said casing including
an operating member supported for limited pivotal movement from an "off" position to an "on" position about a stationary pivotal axis spaced above said electrical contacts,
a trip member mounted for limited pivotal movement about said stationary pivotal axis,
means for latching said trip member in a normal operating position,
means including a drive member mounted on said trip member for limited pivotal movement about a second pivotal axis parallel to and laterally displaced from said stationary pivotal axis, said drive member having a drive portion extending into the space between said pivotal axes for operative engagement with the actuating portion of said switching member, and at least one toggle spring extending generally from side to side of said casing and connected to exert a force between said operating member and said drive member generally transverse to the direction of reciprocation of said switching member; and condition responsive means for releasing said latching means and for forcing said trip member to rotate about said stationary pivotal axis to a tripped position in which the second pivotal axis is carried in the direction of said electrical contacts past the line of force of said toggle springs to force said drive member to snap upward under the influence of said toggle springs to open said electrical contacts.

5. A circuit breaker assembly comprising:

a switch housing containing electrical contacts;

a casing removably mounted on said housing;

a switching member mounted in said housing for reciprocating switch actuating movement, said switching member having an actuating portion extending beyond said housing and into said casing;

spring means in said housing, biasing said switching member from an "on" position to an "off" position in which said actuating portion extends further into said casing;

a toggle mechanism mounted within said casing and removable with said casing including an operating member supported for limited pivotal movement from an "off" position to an "on" position about a stationary pivotal axis spaced above said electrical contacts, a trip member mounted for limited pivotal movement about said stationary pivotal axis, means for latching said trip member in a normal operating position, means including a drive member mounted on said trip member for limited pivotal movement about a second pivotal axis parallel to and laterally adjacent said stationary pivotal axis when said trip member is in its normal operating position, said drive member having a drive portion extending into the space between said pivotal axes for operative engagement with the actuating portion of said switching member, and a pair of toggle springs extending generally from side to side of said casing and connected with the drive portion of said drive member therebetween to exert a force between said operating member and said drive member generally transverse to the direction of reciprocation of said switching member; and condition responsive means for releasing said latching means and for forcing said trip member to rotate about said stationary pivotal axis to a tripped position in which the second pivotal axis is carried in a direction toward said electrical contacts past the line of force of said toggle springs to force said drive member to snap upward under the influence of said toggle springs to open said electrical contacts.

6. The circuit breaker assembly of claim 5 in which said condition responsive means comprises:

a resistance heater in circuit with said electrical contacts to be heated by excessive current through said contacts;

a rigid bracket having a base portion and a cantilever support arm extended therefrom;

means for affixing the base portion of said bracket to said switch housing;

an elongated bimetallic element fastened at one of its ends to the free end of said cantilever support arm, said bimetallic element being spaced between said support arm and said resistance heater and extending toward the base portion of said bracket, the high expansion side of said element facing said resistance heater in heat absorbing relationship thereto;

an overcenter spring extending between a pivot point on the other end of said bimetallic element and a pivot point on the base portion of said bracket, whereby changes in thermal conditions cause said other end of said bimetallic element to snap quickly between positions on opposite sides of the pivot point on said base portion;

said support arm of said bracket having an aperture therethrough adjacent said other end of said bimetallic element;

an operating member supported for limited pivotal said support arm of said bracket having an aperture in said bracket;

and a motion transmitting member having a cupped recess therein engaging the end of the said actuating rod beyond the aperture in said bracket for releasing said latching means.

7. A circuit breaker assembly comprising:

an enclosure having a base portion;

relatively movable electrical contacts arranged adjacent the base of said enclosure;

a trip member mounted on a stationary pivot overlying said electrical contacts;

releasable latching means for retaining said trip member in a normal operating position;

a contact actuating arm for actuating said electrical contacts having one end pivotally mounted on said trip member on a movable pivot located in a spaced relationship with respect to said stationary pivot with the axis of said stationary and movable pivots being parallel;

an operating member mounted on said stationary pivot;

first spring means connecting said contact actuating arm and said operating member;

means for moving said operating member on said stationary pivot, thereby to move the line of force of said spring means from one side to the other of said movable pivot for movement of said contact actuating arm between circuit opening and circuit closing positions;

second spring means for urging said trip member to rotate about its stationary pivot to a tripped position when said latching means is released, thereby to move the movable pivot from one side to the other of the line of force of said first spring means for operation of said contact actuating arm by said first spring means from the circuit closing position to the circuit opening position;

and condition responsive means sensitive to excessive electrical current through said electrical contacts for releasing said latching means.

8. A circuit breaker assembly comprising:

an enclosure having a base portion;

a trip member mounted on a stationary pivot overlying the base portion of said enclosure;

releasable latchable means for retaining said trip member in a normal operating position;

a contact actuating member pivotally mounted on said trip member on a movable pivot located in a fixed spaced relationship with respect to said stationary pivot, with the axis of said stationary and movable pivots being parallel, said contact actuating member having a drive arm extending into the space between said pivots for movement within said space toward and away from the base of said enclosure;

relatively movable electrical contacts arranged adjacent the base of said enclosure for actuation by said drive arm;

an operating member mounted on said stationary pivot;

spring means connecting said contact actuating member and said operating member;

means for moving said operating member on said stationary pivot, thereby to move the line of force of said spring means from one side to the other of said movable pivot for movement of said drive arm toward the base of said enclosure for closing said contacts and away from the base of the enclosure for opening said contacts;

second spring means for urging said trip member to rotate about its stationary pivot to a tripped position when said latching means is released, thereby to move the movable pivot from one side to the other of the line of force of said first spring means to force a contact-opening movement of said drive arm away from the base of said enclosure; and condition responsive means sensitive to excessive electrical current through said electrical contacts for releasing said latching means.

9. The circuit breaker assembly of claim 8 in which said condition responsive means includes:

a rigid bracket having a base portion and a cantilever support arm extending therefrom;

means for fastening the base portion of said bracket within said enclosure;

an elongated bimetallic element fastened at one of its ends to the free end of said cantilever support arm and extending alongside but spaced from said support arm toward the base portion of said bracket, the high expansion side of said element facing away from said support arm;

a resistance heater in circuit with said electrical contacts for generating heat in response to excessive electrical current through said contacts, said resistance heater being arranged closely adjacent the high expansion side of said bimetallic element;

an overcenter spring extending between a pivot point on the other end of said bimetallic element and a pivot point on the base portion of said bracket, whereby changes in the temperature of said resistance heater cause said other end of said bimetallic element to snap quickly between positions on opposite sides of the pivot point on the base portion of said bracket;

said support arm of said bracket having an aperture therethrough adjacent said other end of said bimetallic element;

an actuating rod affixed to said other end of said bimetallic element and extending through the aperture in said bracket;

and means including a motion transmitting member having a cupped recess engaging the other end of said actuating rod for releasing said latching means.

10. A circuit breaker assembly comprising:

a switch housing containing electrical contacts adjacent a base portion thereof;

a switching member mounted in said housing for reciprocating switch actuating movement, said switching member having an end extending beyond said housing;

spring means in said housing urging said switching member toward an "off" position away from the base of said housing;

a casing removably mounted on said housing over the end of said switching member, said casing having a top, side walls and a base through which said end of said switching member extends;

an operating member supported for limited pivotal movement from an "off" position to an "on" position about a first stationary pivotal axis within said casing;

a drive member mounted for limited pivotal movement about a second pivotal axis parallel to and displaced from said stationary pivotal axis, said pivotal axes being approximately equidistant from the top of said casing, said drive member having a drive arm extending into the space between said pivotal axes to engage the end of said switching member for movement within said space toward the base of said casing to an "on" position and away from the base of said casing to an "off" position;

toggle means including a pair of toggle springs extending laterally across the space between said pivotal axes and connected to exert a force between said operating member and said drive member;

means including an operating handle extending through the top of said casing for moving said operating member on its pivotal axis, thereby to move the line of force of said toggle springs past said second pivotal axis, thereby to force the drive arm of said drive member to snap quickly between the limits of its pivotal movement.

11. A circuit breaker assembly comprising:

a switch housing containing electrical contacts adjacent a base portion thereof;

a switching member mounted in said housing for reciprocating switch actuating movement, said switching member having an end extending beyond said housing;

spring means in said housing urging said switching member toward an "off" position away from the base of said housing;

a casing removably mounted on said housing over the end of said switching member, said casing having a top, side walls, and a base through which said end of said switching member extends;

an operating member supported for limited pivotal movement from an "off" position to an "on" position about a first stationary pivotal axis within said casing;

a drive member mounted for limited pivotal movement about a second pivotal axis parallel to and displaced from said stationary pivotal axis, said pivotal axes being approximately equidistant from the top of said casing, said drive member having a drive arm extending into the space between said pivotal axes to engage the end of said switching member for movement within said space toward the base of said casing to an "on" position and away from the base of said casing to an "off" position;

toggle means including a pair of toggle springs extending laterally across the space between said pivotal axes and connected to exert a force between said operating member and said drive member;

means including an operating handle extending through the top of said casing for moving said operating member on its pivotal axis, thereby to move the line of force of said toggle springs past said second pivotal axis, thereby to force the drive arm of said drive member to snap quickly between the limits of its pivotal movement; and condition responsive means for displacing the second pivotal axis of said drive member toward the base of said casing past the line of force of said toggle springs to force the drive arm of said drive member away from the base of the casing to its "off" position.

12. In combination:

a casing having a base, lateral side walls, and a top;

an operating member supported for limited pivotal movement from an "off" position to an "on" position about a stationary pivotal axis within said casing parallel to the top of said casing;

an operating handle extending through the top of said casing for moving said operating member between said "off" and "on" positions;

a trip member mounted for limited pivotal movement about said stationary pivotal axis;

means for latching said trip member in a normal operating position;

means including a drive member mounted on said trip member for limited pivotal movement about a second pivotal axis parallel to and laterally displaced from said stationary pivotal axis, said drive member having a drive portion extending into the space between said pivotal axes for movement within said space toward and away from the base of said casing;

toggle means including a pair of toggle springs extending in lateral directions from side to side of said casing and connected to exert a force between said operating member and said drive member generally parallel to the top and base of said casing whereby movements of said operating member between its "off" and "on" positions cause the line of force of said toggle springs to move past the second pivotal axis thereby to force the drive portion of said drive member to snap quickly between the limits of its pivotal movement;

and condition responsive means for releasing said latching means and for forcing said trip member to rotate about said stationary pivotal axis to a tripped position in which the second pivotal axis is carried toward the base of said casing past the line of force of said toggle springs to force said drive member to snap away from the base of said casing under the influence of said toggle springs.

13. In combination:

a casing having a base, side walls and a top;

an operating member supported for limited pivotal movement from an "off" position to an "on" position about a stationary pivotal axis within said casing parallel to the top of said casing;

an operating handle extending through the top of said casing for moving said operating member between said "off" and "on" positions;

means including a drive member mounted for limited pivotal movement about a second pivotal axis parallel to and laterally displaced from said stationary pivotal axis, said drive member having a drive portion extending into the space between said pivotal axes for movement within said space toward and away from the base of said casing, so as to drive a contact actuating member;

toggle means including a pair of toggle springs extending generally from side to side of said casing and connected to exert a force between said operating member and said drive member generally parallel to the top and base of said casing whereby movement of said operating member between its "off" and "on" positions causes the line of force of said toggle springs to move past the second pivotal axis thereby to force the drive portion of said drive member to snap quickly between the limits of its pivotal movement.

14. In combination:

a casing having a base, side walls, and a top;

an operating member supported for limited pivotal movement from an "off" position to an "on" position about a stationary pivotal axis within said casing;

a drive member mounted for limited pivotal movement about a second pivotal axis parallel to and displaced from said stationary pivotal axis, said pivotal axes being approximately equidistant from the top of said casing, said drive member having a drive arm extending into the space between said pivotal axes for movement within said space toward the base of said casing to an "on" position and away from the base of said casing to an "off" position, so as to drive a contact actuating member;

toggle means including a pair of toggle springs extending laterally across the space between said pivotal axes and connected to exert a force between said operating member and said drive member;

means including an operating handle extending through the top of said casing for moving said operating member on its pivotal axis thereby to move the line of force of said toggle springs past the second pivotal axis thereby to force the drive arm of said drive member to snap quickly between the limits of its pivotal movement.

References Cited by the Examiner

UNITED STATES PATENTS

| | | | |
|---|---|---|---|
| 2,125,201 | 7/1938 | Rowe | 200—116 |
| 2,185,524 | 1/1940 | Sachs | 200—116 |
| 2,248,387 | 7/1941 | Rosing et al. | 200—124 |
| 2,263,208 | 11/1941 | Getchell | 200—116 |
| 2,360,431 | 10/1944 | Link | 200—116 |
| 2,362,257 | 11/1944 | Favre | 200—116 |
| 2,540,491 | 2/1951 | Rowe et al. | 200—116 |
| 2,600,223 | 6/1952 | Dorfman et al. | 200—116 |
| 2,629,796 | 2/1953 | Kern | 200—116 |
| 2,972,664 | 2/1961 | Furnas et al. | 200—116 |
| 3,023,288 | 2/1962 | Bodenschatz | 200—116 |

BERNARD A. GILHEANY, *Primary Examiner.*

H. B. GILSON, *Assistant Examiner.*